United States Patent Office 2,929,168
Patented Mar. 22, 1960

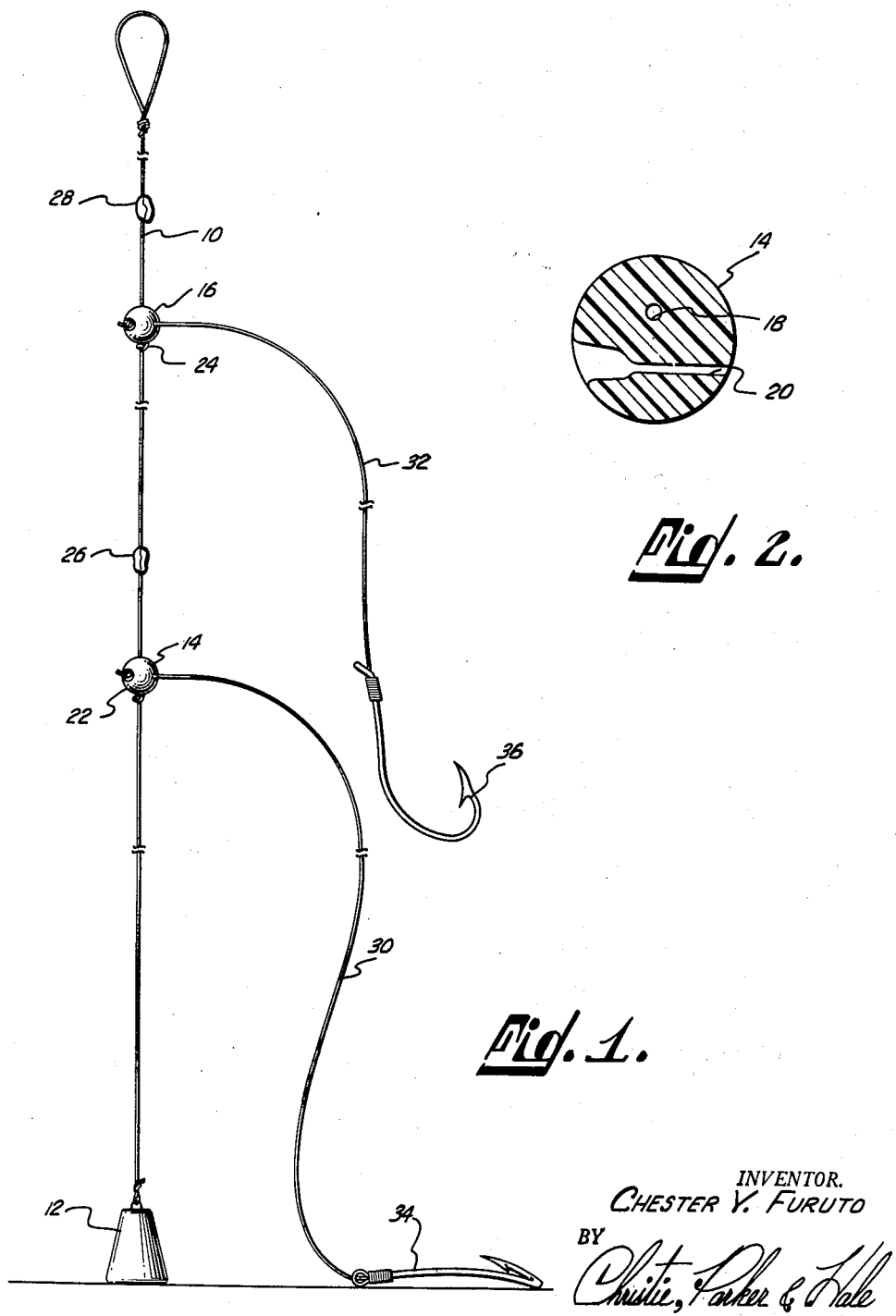

2,929,168
FISHING TACKLE

Chester Y. Furuto, Arcadia, Calif.

Application May 2, 1958, Serial No. 732,515

3 Claims. (Cl. 43—44.84)

This invention relates to fishing tackle, and more particularly, is concerned with multiple leader and hook gear.

Using a plurality of hooks with one fishing line is well known. Various ways have been devised for securing the multiple hooks to the single line in an effort to prevent fouling of the line and tangling of the hooks.

The present means provides an improved arrangement for mounting a plurality of hooks to a single fishing line in a manner that greatly limits the chance of the line becoming tangled or fouled. Particularly, the present invention provides an arrangement for securing a plurality of hooks to a single line in such a manner that a fish, hooked by one of the hooks, is less likely to entangle the line.

In brief the present invention provides a single main leader to which may be secured a sinker at one end, with a plurality of spherical beads having holes therethrough for slidably mounting the beads on the main leader. Means is provided for limiting the sliding movement of the beads along the main leader and maintaining the beads in spaced relationship. Auxiliary leaders extend through holes in the beads which extend substantially at right angles to the holes receiving the main leader but which do not intersect. The auxiliary leaders extending through the beads have fish hooks secured to one end, the other end having means for preventing the auxiliary leader from sliding out of the hole in the associated bead. The beads are made of a smooth spherical-shaped luminescent material.

For a better understanding of the invention, reference should be had to the accompanying drawing, wherein:

Fig. 1 shows the assembled tackle of the present invention;

Fig. 2 shows one of the beads in cross section.

Referring to Fig. 1 in detail, the numeral 10 indicates a main leader which may be a single heavy strand of nylon, gut, or other suitable leader material. The leader has a loop tied at each end, one end being secured to the fishing line and the other end being secured to lead weight or sinker 12.

Strung along the main leader 10 are a plurality of beads, such as indicated at 14 and 16. As shown in Fig. 2, each of the beads has a pair of non-intersecting skewed openings 18 and 20 extending substantially at right angles to each other. The main leader 10 extends through the hole 18, the hole being larger than the diameter of the leader so that the bead is free to rotate on the leader.

The beads when strung on the leader are held in spaced relationship by a plurality of knots tied in the main leader, such as indicated at 22 and 24. Sliding movement of the beads along the leader 10 may be limited by pinching small split-lead sinkers onto the line above each of the beads, as indicated at 26 and 28.

Auxiliary leaders, as indicated at 30 and 32 respectively, pass through the second openings 20 in the beads 14 and 16. A fish hook is secured to one end of the respective auxiliary leaders, as indicated at 34 and 36 respectively.

As shown in Fig. 2, the opening 20 which receives the auxiliary leader is preferably enlarged at one end, with the opening tapering down to a smaller diameter at the other end. The auxiliary leader is knotted at the opposite end from the hook, the knot wedging into the enlarged end of the opening 20 of the associated bead. In this manner the auxiliary leader is held against sliding movement through the opening 20.

From the above description it will be recognized that an improved arrangement is provided by the present invention for securing a plurality of hooks to a single fishing line. The smooth round beads permit the auxiliary lines and hooks to be moved around the main leader, as, for example, by the movements of a hooked fish, the pivoting movement of the bead on the main leader preventing the auxiliary leader from becoming entangled with the main leader or the associated fishing line. The beads are preferably spaced along the main leader a distance greater than the length of the auxiliary leader and hook to prevent the hook from snagging adjacent auxiliary leaders. The smooth rounded beads eliminate any sharp corners or loops that might catch the auxiliary leader and cause it to foul with the main leader during gyrations of the auxiliary leader.

The beads 14 and 16 are preferably made of a hard smooth plastic material or glass which is impregnated or coated with a luminescent pigment. The size and shape of the beads and the luminescent pigment combine to act as a lure for attracting fish to the vicinity of the fish line where they can take the baited hooks.

I claim:

1. Fishing apparatus comprising a main leader, a sinker secured to one end of the leader, a plurality of spherical beads, each bead having a pair of non-intersecting holes extending therethrough at substantially a right angle to each other, the main leader extending through one of the holes in each of the beads, the beads being slidably movable along the main leader, means for limiting the sliding movement of each of the beads, said means maintaining the beads in spaced relationship along the length of the main leader, a plurality of auxiliary leaders, each of the auxiliarly leaders being supported from the main leader by an associated one of the beads, the auxiliary leaders extending through the other hole of said pair of holes in the associated bead, a fish hook secured to one end of each of the auxiliary leaders, and means at the opposite end of each of the auxiliary leaders for preventing the auxiliary leaders from slipping through the holes in the associated beads.

2. Apparatus as defined in claim 1 wherein the beads are made of luminescent material, providing light to attract the fish.

3. Fishing apparatus comprising a main leader, a plurality of spherical beads, each bead having a pair of non-intersecting holes extending therethrough at substantially a right angle to each other, the main leader extending through one of the holes in each of the beads, the beads being slidably movable along the main leader, means for limiting the sliding movement of each of the beads, said means maintaining the beads in spaced relationship along the length of the main leader, a plurality of auxiliary leaders, each of the auxiliary leaders being supported from the main leader by an associated one of the beads, the auxiliary leader extending through the other hole of said pair of holes in the associated bead, a fish hook secured to one end of each of the auxiliary leaders, the hole through each of the beads that receives the auxiliary leaders being enlarged at one end, each of the auxiliary leaders having a knot tied in one end, the knot wedging in the enlarged end of the hole through the associated bead.

References Cited in the file of this patent

UNITED STATES PATENTS

| | | |
|---|---|---|
| 1,817,694 | Lafky | Aug. 4, 1931 |
| 1,916,937 | Schlaburg | July 4, 1933 |
| 2,033,701 | Gibbs | Mar. 10, 1936 |
| 2,157,003 | Russina | May 2, 1939 |